United States Patent
Drujon et al.

(10) Patent No.: US 11,174,393 B2
(45) Date of Patent: Nov. 16, 2021

(54) RADIATION-CURABLE COATING COMPOSITION FOR IMPROVING THE SURFACE PROPERTIES OF PLASTICS

(71) Applicant: Arkema France, Colombes (FR)

(72) Inventors: Xavier Francois Drujon, Paris (FR); Manfred Schwartz, Hof (DE); Bernd Laubkermeier, Dinkelsbuhi (DE); Michaela Wilfert, Hof (DE); Markus Holzel, Sparneck (DE)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/629,405

(22) PCT Filed: Jul. 5, 2018

(86) PCT No.: PCT/EP2018/068286
§ 371 (c)(1),
(2) Date: Jan. 9, 2020

(87) PCT Pub. No.: WO2019/011784
PCT Pub. Date: Jan. 17, 2019

(65) Prior Publication Data
US 2021/0130622 A1    May 6, 2021

(30) Foreign Application Priority Data
Jul. 12, 2017   (EP) ..................... 17180951

(51) Int. Cl.
| | |
|---|---|
| *C08F 2/46* | (2006.01) |
| *C08F 2/50* | (2006.01) |
| *C08G 61/04* | (2006.01) |
| *C09D 4/06* | (2006.01) |
| *C08F 220/18* | (2006.01) |
| *C08F 222/10* | (2006.01) |
| *C08F 220/28* | (2006.01) |
| *B05D 3/06* | (2006.01) |
| *C08F 220/14* | (2006.01) |
| *C08F 230/02* | (2006.01) |
| *C08K 5/07* | (2006.01) |

(52) U.S. Cl.
CPC ............. *C09D 4/06* (2013.01); *B05D 3/067* (2013.01); *C08F 2/50* (2013.01); *C08F 220/14* (2013.01); *C08F 220/1804* (2020.02); *C08F 220/1811* (2020.02); *C08F 220/281* (2020.02); *C08F 222/102* (2020.02); *C08F 222/1061* (2020.02); *C08F 222/1065* (2020.02); *C08F 230/02* (2013.01); *C08K 5/07* (2013.01); *B05D 2201/02* (2013.01); *B05D 2502/005* (2013.01)

(58) Field of Classification Search
CPC ... C09D 4/06; C08G 61/04; C08F 2/46; C08F 2/50
USPC ........... 522/43, 33, 6, 189, 184, 71, 1; 520/1
See application file for complete search history.

(56) References Cited

U.S. PATENT DOCUMENTS

| | | |
|---|---|---|
| 2,471,959 A | 5/1949 | Hunt |
| 4,339,474 A | 7/1982 | Kishida et al. |
| 5,001,177 A | 3/1991 | Winfried et al. |
| 5,208,081 A | 5/1993 | Gubitz et al. |
| 9,623,631 B2 | 4/2017 | Mgaya et al. |
| 2006/0029378 A1 | 2/2006 | Noguchi |
| 2008/0102262 A1 | 5/2008 | Esaki et al. |
| 2010/0280170 A1 | 11/2010 | Flosbach et al. |
| 2019/0085113 A1* | 3/2019 | Inoubli ................ C09D 11/107 |

FOREIGN PATENT DOCUMENTS

| | | |
|---|---|---|
| DE | 2928215 A1 | 1/1981 |
| DE | 19652728 A1 | 6/1997 |
| DE | 10009851 A1 | 9/2001 |
| DE | 102005009209 A1 | 8/2006 |
| EP | 1177875 A1 | 8/2000 |
| EP | 2513210 A1 | 10/2012 |
| WO | WO 2013/023545 A1 | 2/2013 |
| WO | WO-2013023545 A1 * | 2/2013 ............ C09J 133/14 |
| WO | WO 2016/071510 A1 | 5/2016 |
| WO | WO-2016150821 A1 * | 9/2016 ............. B05D 3/067 |

OTHER PUBLICATIONS

Zhang et al., WO 2013-023545 Machine Translation, Feb. 21, 2013 (Year: 2013).*

* cited by examiner

*Primary Examiner* — Jessica Whiteley
(74) *Attorney, Agent, or Firm* — Christopher R. Lewis

(57) ABSTRACT

The present invention relates to a specific radiation-curable coating composition for improving the surface adhesion of plastic parts and its uses as a primer coat, as a base coat or as a clear coat. The composition may be pigmented or unpigmented and may be cured by UV and/or EB. The invention also relates to cured coating resulting from this cure and to the coated plastic substrate with improved surface adhesion.

26 Claims, No Drawings

RADIATION-CURABLE COATING COMPOSITION FOR IMPROVING THE SURFACE PROPERTIES OF PLASTICS

CROSS-REFERENCE TO RELATED APPLICATIONS

This application is a U.S. national stage application under 35 U.S.C. § 371 of PCT/EP2018/068286, filed Jul. 5, 2018, which claims the benefit of European Patent Application No. 17180951.0, filed Jul. 12, 2017.

FIELD OF THE INVENTION

The present invention relates to a radiation-curable coating composition for coatings having improved adhesion on finished plastic surfaces, the radiation-cured coating which may be a varnish or a paint, in particular UV-cured or EB-cured coating and its uses as a base coat, clear coat or primer coat on plastic surfaces for improving adhesion. It could be also be used as a second coating like a paint. The coating resulting from the coating composition of the present invention is particularly suitable for improving the surface properties like paint adhesion of plastic parts exposed to stress. It is well-known that adhesion of a coating on a plastic surface under stress is difficult to achieve. The invention relates to a specific coating composition of oligomers and monomers which is radiation-curable more particularly by UV or EB-cure. The application of such a specific radiation-curable coating composition to a plastic surface and its cure by the means of radiation enables an adhesion improvement of the coating on the plastic surface, particularly with an improved paint adhesion. In fact, the intermediate coating resulting from the composition of the present invention is used as an adhesion improving primer coating. The coating resulting from the composition of the present invention can also be used as the last coating layer like a clear coat.

BACKGROUND OF THE INVENTION

For a UV-curable coating composition, the presence of a photoinitiator is required while if it is an electron-beam-curable (EB-curable), the photoinitiator is not required. In addition, the coating composition of the present invention does not contain any halogenated coupling agent as known from prior art for such an improvement.

More particularly, the coating resulting from the composition of the present invention is a varnish.

EP 2 513 210 B1 discloses a coating on polyethylene (PE) or polypropylene (PP) and a method for a coating on such plastics. Herein, the polymer is primed with a coating containing at least one halogenated polyolefin and coated with at least one coat cured by polymerization involving a radical reaction to get a cured elastic lacquer.

DE 40 25 361 A1 discloses a plastic molding with varnished surface composition and a process for its production. The molded body is provided with a single-ply roof layer and is suitable for outdoor applications on the automobile. In the examples, the use of a coupling agent based on a chlorinated amorphous PP is mentioned.

DE 100 09 851 C2 discloses a cover material for painted surfaces of a motor vehicle door part of plastic material. As adhesive, poly isobutylenes are used.

DE 196 52 728 A1 discloses a composition and a process for applying a surface protection on a motor vehicle. Herein, the body is coated with a polymer dispersion based on vinyl esters or acrylate esters.

DE 10 2005 009 209 A1 describes a coating agent for producing formable scratchproof coatings with dirt-repellent effect, but sulphur compounds are needed.

EP 1 177 875 A1 teaches a method for producing a decorated injection molded article, whereby a thermo formable film with release property is placed in an injection mold cavity.

One main disadvantage of the prior art is that consuming procedures are necessary, which is not the case for the composition of the present invention.

SUMMARY OF THE INVENTION

It is an object of the invention to develop a curable coating composition for improving the surface properties of painted plastic parts, which can be realized with simple process steps and leads to a better adhesion of the coating on the polymer, without using additional means.

The solution of the task proposed by the present invention is improving the surface properties of plastics, by using a specific radiation-curable composition which is the first subject-matter of the present invention.

The said specific radiation-curable coating composition according to the present invention is comprising:
A) 20 to 60%, preferably 20 to 50 wt.-% of at least one oligomer bearing at least one, preferably at least two ethylenic unsaturations, more preferably (meth)acrylic groups
B) 0.1 to 35%, preferably 0.1 to 30 wt.-% of at least one ethylenically unsaturated monomer, preferably (meth)acrylate monomer, having a surface tension measured according to contact angle method NF EN 14370 which is lower than 35 mN/m, preferably lower than 32 mN/m and more preferably from 25 to 30 mN/m,
C) 0.1 to 20%, preferably 0.5 to 20 wt.-% of at least one ethylenically unsaturated monomer, preferably (meth) acrylate monomer, with high hydrophilicity which means having a calculated Hansen solubility parameter δp, calculated according to the method described in "Hansen Solubility Parameters: a user's handbook" by Charles M. Hansen (Chapter I, table 1.1) ISBN 068494-1525-5) higher than 4 $MPa^{1/2}$, preferably higher than 5 $MPa^{1/2}$,
D) 0 to 10%, preferably 0 to 5 wt.-% of at least one photoinitiator,
E) 0 to 75%, preferably 5 to 60 wt.-% of a reactive diluent selected from at least one monomer other than B) and C) and bearing at least one ethylenically unsaturated group, preferably (meth)acrylic group,
F) 0 to 20%, preferably 0 to 15 wt.-% of a phosphoric ester comprising an ethylenically unsaturated group, preferably a (meth)acrylate group used as an adhesion promoter
and with the sum of wt % of components A+B+C+D+E+F being=100%.

E) is monomeric diluent different from B), C) and F) and F) is also different from B) and C).

When component D) (photoinitiator) is present, then, the composition is curable by UV-radiation. When D) is absent, the composition is curable by EB (electron beam) radiation.

DETAILED DESCRIPTION OF THE INVENTION

More particularly, said radiation-curable coating composition of the present invention is comprising:
A) 20 to 50 wt.-% of said at least one oligomer A as defined above, with said oligomer comprising at least one oligomeric segment selected from polyurethane and/or poly(meth)acrylate and/or polyester segments and B) 0.1 to 30 wt.-% of said at least one ethylenically unsaturated monomer B) as defined above, with said monomer B) being selected from the group consisting of tert-butyl cyclohexyl acrylate, isobornyl acrylate isodecyl acrylate, 3,5,5 trimethyl cyclohexyl acrylate and methacrylate, isooctyl acrylate, octyl decyl acrylate, tridecyl acrylate, lauryl 4EO acrylate (with lauryl bearing 4 ethoxy units) and $C_{12}$-$C_{15}$ alkyl methacrylate, C) 0.5 to 20 wt.-% of said at least one ethylenically unsaturated monomer C), as defined above, with said monomer C) being selected from the group consisting of 2-ethoxyethyl acrylate, 2(2-ethoxyethoxy)-ethyl acrylate (which is synonym of acrylate of diethylene glycol monoethyl ether) or tetrahydrofufuryl acrylate, D) 0 to 5 wt.-% of said least one photoinitiator, E) 5 to 60 wt.-% of said reactive diluent as defined above, F) 0 to 15 wt.-% of said phosphoric ester comprising an ethylenically unsaturated group above, with said phosphoric ester F) being selected from the group consisting of monoesters of hydroxyalkyl (meth)acrylates with phosphoric acid which may additionally comprise a diester of hydroxyl alkyl (meth)acrylate with phosphoric acid, and with the sum of wt % of components A+B+C+D+E+F being=100%.

Even more particularly, said oligomer A) is a urethane (meth)acrylate oligomer (including polyurethane (meth)acrylate oligomer) bearing from 2 to 6 (meth)acrylic groups, preferably acrylate groups, which oligomer contains free isocyanate functional groups in addition to the (meth)acrylic group(s). According to a more particular option, said urethane (meth)acrylate oligomer comprises polyester segments based on (comprising or consisting of) polycaprolactone segments.

According to another specific option, said oligomer A) is an acrylic (meth)acrylated oligomer.

According to a particular embodiment, said radiation-curable coating composition comprises components A), B), C) and E). In such a case, E) is present at a weight % (vs A+B+C+E) of 1 to 75%, preferably from 5 to 60% w/w. Such a coating composition is curable (suitable for cure) by EB cure (electron beam cure).

Component F) is further used when a further improvement of adhesion of the coating composition on a substrate is required.

According to another particular embodiment, said radiation-curable coating composition comprises components A), B), C) and D). Such a coating composition is a UV-curable composition (suitable for UV-cure).

According to another more particular embodiment, components A), B), C), D) and E) are present in said coating composition. This composition is a UV-curable coating composition.

The presence of E) (reactive diluent) is required when the composition A+B+C is too viscous to be suitable for coating at room temperature.

A suitable viscosity at room temperature (20° C.) for a coating composition A+B+C or A+B+C+E, A+B+C+D, A+B+C+D+E or A+B+C+D+E+F should be in the range of 20 to 250 mPa·s in a rotation viscometer according to DIN 53 019.

The term "plastics" as used in the present invention generally relates to molded plastic parts based on polymeric molding compositions. These polymeric molding compositions contain polymers, optionally formulated with fillers, aggregates, reinforcing fibers and other additives. This leads for processing, molding coating with the radiation curable composition of the present invention and finally painting with better paint adhesion on the plastic surface and generally better surface properties of the molded plastic parts.

The polymer is chosen out from the group of thermoplastic and thermosetting polymer materials or thermoplastic and thermosetting plastic materials (also respectively called "thermoplastics" and "thermosets" here-below), where:

thermoplastics may be selected from polyolefins (non-halogenated) especially like polyethylene or polypropylene, poly(meth)acrylates, polystyrene, polyvinyl chloride (PVC), polyamides, polyurethanes, polycarbonates, polylactic acid (PLA), saturated polyesters like PET (polyethylene terephthalate), copolymers ethylene-propylene-diene (EPDM), copolymers acrylonitrile-styrene-butadiene (ABS) vinyl polymers selected from halogenated polymers other than PVC which are chlorinated polymers (other than PVC) like polychlorovinylidene or are fluorinated polymers, especially polyfluorovinylidene, polytetrafluorethylene or poly chlorotrifluorethylene, more preferably said thermoplastics being selected from polyolefins, poly(meth)acrylates, polyesters, polyamides, polycarbonates, polyurethanes, polyvivnyl chloride, ABS, PS, EPDM, vinyl polymers or from thermosets, preferably being selected from phenol resins, epoxy resins, unsaturated poly ester resins, resins with furanic groups, resins with urea groups, melamine resins, poly urethane resins, more preferably said thermosets being selected from phenol resins, epoxy resins, PU resins, unsaturated polyester resins or from mixtures of the above-cited thermoplastics or the above-cited thermosets from fiber-reinforced polymers or composites derived from the above-cited thermoplastics or thermosets, like SMC or BMC molding compositions.

These polymeric materials (or plastics) may be in the form of homopolymers or of copolymers or of mixtures (if compatible) of homopolymers or of copolymers and may be fiber-reinforced as in composite polymeric materials which may be thermoplastic or thermosetting fiber-reinforced composites.

As examples, not being a complete listing, also biopolymers like Bio-PE, Bio-PP, PLA and their copolymers are mentioned.

The plastic molded part based on these polymers can also be issued from a Sheet Molding Compound (SMC) or Bulk Molding compound (BMC). Sheet molding composite or SMC is a ready to mold glass-fibre reinforced polyester material primarily used in compression molding. The sheet is provided in rolls weighing up to 1,000 kg. SMC is both a process and reinforced composite material. This is manufactured by dispersing long strands (usually >1") of chopped fiber (commonly glass fibers or carbon fibers on a bath of resin (commonly polyester resin, vinyl ester resin or epoxy resin). The longer fibers in SMC result in better strength properties than standard bulk molding compound (BMC) products.

Typical applications include demanding electrical applications, corrosion resistant needs, structural components at low cost, automotive and transit.

The polymer can also be a fiber-reinforced polymer. As example, glass fiber reinforced polyolefin or carbon fiber reinforced polyester can be mentioned. Further, the polymer can be from the group e.g. polyamide, polyester, especially polycarbonate and its blends and copolymers. As examples can be mentioned PC/ABS and PC/PET. These also can be filled with minerals.

Especially, fillers from the group of smectic clays, especially smectite, laponite, talc and caolinite and mixtures thereof are chosen. Preferred fillers are montmorillonite, thereof specially preferred are talc and kaolin.

The used coating materials for polymers can be formulated without pigment as well as with pigment. The functional coat of the lacquer can be the one of a filler, primer, base coat and/or clear coat.

Current primers of prior art for exterior plastic parts are normally based on binder, solvents, pigments, fillers and other ingredients necessary for the appropriate application. Normally, a typical representative formulation consists of an OH-group containing binder, talc, titanium dioxide, baryte, carbon black, defoamer, solvent package, adhesion promoter and others.

A primer for exterior plastic parts based on the present invention comprises the specific coating composition of the present invention as a binder, containing at least components A) and possibly B), C), D), E) (reactive diluent) and F) as defined above fillers and other ingredients (additives) necessary for the appropriate application as defined according to component G). Examples of primers compositions according to the present invention are given in tables 1 (formula P1) and 2 (formula P2).

Current base coats of prior art for exterior plastic parts are normally based on binder, solvents, pigments, fillers and other ingredients necessary for the appropriate application. Normally, a typical representative formulation consists of a binder, pigments necessary to define the color, fillers, as e.g. talc, defoamer, solvent package, adhesion promoter and others.

A base coat for exterior plastic parts based on the present invention comprises the specific coating composition of the present invention as a binder, containing at least components A) and possibly B), C), D), E) (reactive diluent) and F) as defined above fillers and other ingredients (additives) necessary for the appropriate application as additives G) and if required additionally pigments.

Examples of base coats (BC) compositions according to the present invention are given in table 3.

Current clear coats of prior art for exterior plastic parts are normally based on binder, solvents, pigments, additives, stabilizers, fillers and other ingredients necessary for the appropriate application. Normally, a typical representative formulation contains an OH-group containing binder, UV-absorber, radical scavenger, solvent package, adhesion promoter and others. For cross linking of the OH-functions, isocyanates based on e.g. IPI or HDPI can be used. Other isocyanates can also be used. Also oligomers of isocyanates, like e.g. trimers of IPI or HDPI, can be used.

A clear coat for exterior plastic parts based on the present invention comprises the specific coating composition of the present invention as binder, containing at least components A) and possibly B), C), D), E) (reactive diluent) and F) as defined above, additives, stabilizers, fillers and other ingredients necessary for the appropriate application as additives G) and if required (pigmented) additionally pigments.

Examples of clear coats (CC) compositions according to the present invention are given in table 4.

The advantage of the present invention is the simplicity of preparation and simplicity of use in a UV/EB cure process of the curable coating composition and of the reaction to improve the surface properties. The use of the radiation-curable coating composition of the invention is particularly suitable for painted plastic body parts, in particular under stress.

Preferably, the said coating composition is a UV and/or an EB-curable coating composition. UV-curable means the necessary presence of the photoinitiator D) while for EB-curable compositions, said photoinitiator D) is not necessary.

According to specific embodiments, the said composition is a base coat composition or a clear coat composition or a primer coat composition.

According to another preferred embodiment, the said oligomer A) is a urethane (meth)acrylate or an acrylic (meth)acrylate bearing at least two (meth)acrylic groups. According to a particular embodiment, said oligomer A) is a urethane (meth)acrylate bearing free isocyanate groups. More particularly, said oligomer A) has a content of isocyanate groups from 0.5 to 15%, preferably from 1 to 15% by weight of NCO groups. This weight content is expressed in weight of NCO groups by weight of said oligomer A).

According to another option, the said oligomer A) is a urethane (meth)acrylate bearing from 2 to 6 (meth)acrylic groups, preferably acrylate groups.

The said radiation-curable coating composition may be a pigmented or unpigmented coating composition. More particularly, said coating composition can be a paint (if pigmented) or a varnish (if unpigmented).

A second subject of the present invention relates to a cured coating resulting from the radiation cure of at least one layer of at least one curable coating composition as defined according to the present invention. The said cured coating may be a primer, a base coat or a clear coat.

A third subject of the present invention relates to the use of the coating composition as defined above according to the present invention, for improving the adhesion of coatings on plastic surfaces and more particularly said use is for coating surfaces of shaped parts containing plastics, preferably in the automotive field. More specifically, said coating is used in at least one layer or in one or in multiple layers on the said plastic surface and it is cured by UV and/or EB radiation for each of said layers.

More particularly, in said use, the said coating composition is used as a primer and/or as a base coat and/or as a clear coat or as a binary or as a ternary combination of these uses on the said plastic surface (plastic substrate). Even, more particularly, this use is for coatings, in particular paints having improved adhesion on the said plastic surfaces.

Finally, the present invention relates to a shaped parts comprising a plastic surface coated with at least one layer of a coating resulting from the cure by radiation of at least one coating composition as defined according to the present invention. More particularly, in said shaped part said coating is a primer and/or a base coat and/or a clear coat. More preferably, said shaped parts are for use in the field of automotive applications.

According to the invention the radiation-curable, preferably UV and EB-curable coating composition of the invention comprises:
    Component A)
    Component B)
    Component C)
    Component D)
    Component E)
    Component F)
all as defined above, with each component A) to G) being further defined in more details as here-below with all possible combinations of each component A) to F) according to the specific, the preferred and the more preferred specifications and definitions. The composition with components A) to F) may be considered as a binder composition. Pigments can be present for pigmented compositions (paints) or absent for unpigmented ones (varnishes).

Component A)

Component A) is an oligomeric component which has an average in number molecular weight Mn greater than 1,000 g per mole and preferably within the range of from 1,000 to 12,000 g per mole. Mn is measured by GPC in THF with polystyrene standard calibration.

Oligomeric component A) comprises:
an oligomeric segment selected from polyurethane and/or poly(meth)acrylate and/or polyester segments and
at least one, preferably at least two functional polymerizable groups under radiation (UV or EB), these polymerizable groups being selected from (meth)acrylic groups, in particular acrylates.

According to a specific embodiment, the oligomeric component A) is a urethane (meth)acrylate and it means that the oligomer A) comprises polyurethane segments.

Most commonly, the polyurethane segments are typically prepared by initially reacting a mixture of polyols with a molar excess of polyisocyanate to make an isocyanate terminated prepolymer, by most preferably the polymerization of a diisocyanate with a diol. This isocyanate-terminated urethane prepolymer is further reacted, typically with one compound capable of reacting with the isocyanate groups and containing at least one olefinically unsaturated group which is a (meth)acrylic group like hydroxyalkyl (meth)acrylates, preferably with said alkyl being in $C_2$ to $C_4$.

In one embodiment, all of the isocyanate groups are not reacted and the final polyurethane does contain residual (free) isocyanate functional groups in addition to the (meth)acrylic group(s). The content of the isocyanate free groups can vary from 0.5 to 20% by weight and preferably from 1 to 15% by weight (weight of NCO groups/weight of urethane oligomer A)).

Any suitable polyisocyanate compound which contains two or more isocyanate groups may be used for preparing the said isocyanate terminated urethane prepolymers. There are no restrictions regarding the polyisocyanates which can be used, as long as it contains at least two isocyanate groups, such as alkylene diisocyanates, cycloalkylene diisocyanates, aromatic diisocyanates and aliphatic-aromatic diisocyanates. Specific examples of suitable isocyanate-containing compounds include, but are not limited to, hydrogenated 4,4'-methylenebis(phenyl)isocyanate) (HMDI) and isophorone diisocyanate (IPDI), dichlorohexamethylene diisocyanate, furfurylidene diisocyanate, cyclopentylene-1,3-diisocyanate, cyclo-hexylene-1,4-diisocyanate, cyclohexylene-1,2-diisocyanate or triisocyanates with a triisocyanurate ring. Others additional diisocyanates include the various isomers of toluene diisocyanate such as 2,4-toluene diisocyanate, 2,6-toluene diisocyanate and/or mixtures of 2,4- and 2,6-toluene diisocyanate and/or its trimer, meta-xylenediioscyanate and para-xylenediisocyanate, 4,4'-diphenylmethane diisocyanate, 2,4'-diphenylmethane diisocyanate, 2,2-diphenylpropane-4,4'-diisocyanate, tetramethyl xylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 1-chlorobenzene-2,4-diisocyanate, 4,4',4"-triisocyanatotriphenylmethane, 1,3,5-triiso-cyanatobenzene, 2,4,6-triisocyanatotoluene, 4,4'-dimethyldiphenyl-methane-2,2',5,5-tetratetraisocyanate, 4-chloro-1,3-phenylene diisocyanate, 1,5-tetrahydro-naphthalene diisocyanate, 4,4'-dibenzyl diisocyanate and 1,2,4-benzene triisocyanate, 1-methoxyphenyl-2,4-diisocyanate, mixtures of 4,4'-biphenyl diisocyanate, 3,3'-dimethyl-4,4'-biphenyl diisocyanate, 3,3'-dimethyl-4,4'-biphenyl diisocyanate and 3,3'-dimethyldiphenyl methane-4,4'-diisocyanate and the like. While such compounds are commercially available, methods for synthesizing such compounds are well known in the art. Suitable polymeric polyisocyanates include cycloaliphatic and/or aromatic polyisocyanates and/or polymethylene polyphenylenes polyisocyanates (polymeric MDI). Included within the useable isocyanates are those modifications containing carbodiimide, allophonate, urethane or isocyanurate structures.

These polyisocyanates are prepared by conventional methods known in the art, e.g., phosgenation of the corresponding organic amine. Preferred isocyanate-containing compounds are methylene-bis(phenyldiisocyanate) (MDI; 2,4'-MDI, 4,4'-MDI and polymeric MDI), isophorone diisocyanate (IPDI) and/or its trimer, toluene diisocyanate (TDI) and/or its trimer, hydrogenated 4,4'-methylenebis(phenylisocyanate) (HMDI) and/or hexanediisocyanate (HDI) and/or its trimer and/or tetramethylxylylene diisocyanate (TMXDI). In order to minimise yellowing of resulting coating compositions exposed to sunlight, aliphatic polyfunctional isocyanates IPDI, HMDI and HDI are particularly preferred.

Typical polyols are OH-ended functional oligomers with Mn molecular weights typically varying from 400 to 10000 g per mole. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. Examples of polyether polyols include a linear and/or branched polyether having plural numbers of ether bondings and at least two hydroxyl groups and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly, preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, tri isopropanolamine, ethylenediamine and ethanolamine; with at least one compound selected from the group consisting of ethylene oxide, propylene oxide and butylene oxide. Commercially available polyols which may be used in the practice of the invention include polyethers such as ARCOL® PPG 2025 (Bayer), Acclaim® 4200 (Bayer), PolyG® 20-56 (Arch), Pluracol® P-2010 (BASF) and Voranol® P400, P725, P1000, P2000 and P4000 (Dow).

One particular case of urethane oligomer A) is comprising polyester segments based on polycaprolactone. It may bear free NCO groups (0.5-20% w/w, preferably 1-15% w/w vs weight of oligomer A)) or may be NCO-free.

Other polyols used include polyester polyols which are formed from the condensation of one or more polyhydric alcohols typically having from 2 to 15 carbon atoms with one or more polycarboxylic acids typically having from 2 to 14 carbon atoms, although carbon chain lengths can be longer. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, decane diol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimetic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Dimer fatty acids can also be used these are well known in the art and refers to the dimerisation product of mono- or polyunsaturated acids and/or esters thereof. Preferred dimer fatty acids are dimers of $C_{10}$- to a $C_{30}$, more preferably $C_{12}$- to a $C_{24}$, particularly $C_{14}$ to a $C_{22}$ and especially $C_{18}$ alkyl chains. Suitable dimer fatty acids include the dimerisation products of oleic acid, linoleic acid, linolenic acid, palmitoleic acid and elaidic acid. The dimerisation products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerisation usually results in varying amounts of oligomeric fatty acids (so called "trimer") and residues of monomeric fatty acids (so-called "monomer") or esters thereof, being present. Suitable dimer fatty acids have a dimer acid content greater than 60%, preferably greater than 75%, more preferably in the range of 90 to 99.5%, particularly 95 to 99% and especially 97 to 99%. Commercially available polyesters which may be used in the practice of the invention include crystalline and amorphous materials such as Dynacoll® 7360, 7380, 7330, 7231, 7250 (Degussa), Rucoflex® S-105-10 (Bayer), Stepanpol® PNI 10 (Stepan), Priplast® 3196 (Uniqema).

Relatively low molecular weight diols may also be used, often in low concentrations. Examples include ethylene glycol, propylene glycol (such as 1,2-propylene glycol and 1,3-propylene glycol), butanediol, pentanediol, hexanediol, octanediol, decane diol, dodecanediol, chloropentanediol, glycerol monallyl ether, glycerol monoethyl ether, diethylene glycol, 2-ethylhexanediol, 1,4-cyclohexanediol. Alkanolamines such as triethanolamine, dialkylalkanolamine, such as dialkylethanolamine and/or dibutylethanolamine or bis(O,O'-2-aminoethyl)ethyleneglycol may be used. Polyfunctional alcohols may also be used such as glycerol and derivatives, trimethylolpropane and alkoxylated derivatives, 1,4,6-octanetriol, 1,2,6-hexanetriol, 1,3,5-hexanetriol, pentaerythritol and alkoxylated derivatives, dipentaerythritol and alkoxylated derivatives, tripentaerythritol and alkoxylated derivatives, sorbitol, sucrose, glucose, fructose or other sugar alcohols, propoxylated ethylene diamine, propoxylated diethylene triamine and/or Mannich polyols, as well as perfluoroalkyl functional polyols.

For making isocyanate-free (meth)acrylated urethane oligomers A), compounds capable of reacting with the terminal isocyanate groups on the prepolymers (urethane oligomers) and containing at least one olefinically unsaturated group are preferably hydroxy-, amino- and/or thio-functionalised olefinically unsaturated monomers. Typically these are hydroxyl, amine and/or thiol functionalised (meth)acrylates, vinyl silanes, vinyl ethers and/or styrene derivatives. Examples of such suitable functionalized monomers include, but are not limited to 2-hydroxyethyl(meth)acrylate, 2-hydroxypropyl(meth)acrylate, 3-hydroxybutyl(meth)acrylate, diethylaminoethyl(meth)acrylate, dimethylaminoethyl (meth)acrylate, N-Methylolallylcarbamate, N-[3-(Dimethylamino) propyl](meth-)acrylamide, N-[3-(Dimethylamino)ethyl](meth-)acrylate, N,N-[3-Chloro-2-hydroxypropyl)-3-dimethylammonium-propyl] (meth-)acrylamide chloride, hydroxy-propyleneglycol(meth-)acrylate, hydroxyethyleneglycol(meth-)acrylate, o-, m-, p-hydroxy styrene, o-, m-, p-hydroxy methylstyrene, and/or hydroxyl alkyl vinyl ethers, such as 4-hydroxyl butyl vinylether, hydroxyl cyclohexyl vinyl ether or mixtures of two or more thereof. Other examples include pentaerythritol triacrylate and dipentaerythritol pentaacrylate.

In another embodiment, the oligomer component A) comprises poly(meth)acrylate segments and oligomer A) is an acrylic (meth)acrylated oligomer.

In this case, the component A) is a (meth)acrylated (meth)acrylic copolymer oligomer or an acrylic (meth)acrylate. Most commonly, poly(meth)acrylate segments are typically prepared by free radical copolymerization of a mixture of monomers containing:

A1') 1-10 parts w/w, preferably 2-6 parts w/w of olefinically unsaturated monomers bearing a functional group X selected from —OH, carboxy (including carboxylic anhydride) or epoxy and A2') 90-99 parts, preferred 94-98 parts alkyl(meth)acrylates with the sum of A1'+A2'=100.

After copolymerization between A1') and A2'), the functional group X is converted to an ethylenically unsaturated group, in particular to a (meth)acrylate group by reaction of X with:

an ethylenically unsaturated carboxylic acid, like (meth) acrylic acid when X is either OH or epoxy an ethylenically unsaturated epoxy compound, like the (meth)acrylate of glycidyl ether (MAGLY) when X is a carboxy or anhydride group.

Suitable examples of monomers A1') with X=—OH are hydroxyalkyl (meth)acrylates with alkyl in $C_2$-$C_6$, preferably $C_2$-$C_4$.

Suitable examples of monomers A1') with X=carboxy/anhydride are (meth)acrylic acid, itaconic acid and maleic anhydride.

Suitable example of monomers A1') with X=epoxy is (meth)acrylate of glycidyl ether (MAGLY).

The alkyl(meth)acrylates A2') for the preparation of prepolymer (meth)acrylated acrylic oligomer of the present invention are known, where the nomination "(meth)acrylate" is for acrylate, methacrylate as well as for mixtures of both. The alkyl(meth)acrylates contain normally 1-20, preferably 1-8 carbon atoms. Examples are $C_1$- to $C_8$-alkyl esters of acrylic acid or of methacrylic acid such as methyl acrylate, ethyl acrylate, propyl acrylate, isopropyl acrylate, n-butyl acrylate, isobutyl acrylate, n-hexyl acrylate and 2-ethylhexyl acrylate, methyl methacrylate, ethyl methacrylate, n-propyl methacrylate and butyl methacrylate.

Preferred alkyl(meth)acrylates monomers are methyl methacrylate and n-butyl acrylate.

According to a more particular version of said (meth) acrylated acrylic oligomer A), said acrylic oligomer is obtained from a mixture of monomers A1')+A2') as defined above further comprising a monomer A3') (monomer mixture A1'+A2'+A3') with A3') selected from allyl (meth)

acrylates or said mixture of monomers comprises A1') as defined above and additionally said comonomer A3') (mixture of monomers being A1'+A3').

As suitable examples of allyl (meth)acrylate comonomers A3'), can be cited allyl acrylate or allyl methacrylate and other allyl acrylates or allyl methacrylates bearing a substituted allylic group, in particular substituted by an alkyl group, preferably a methyl group, like 2-methyl-allyl acrylate or 2-methyl-allyl methacrylate or allyl polyether (meth) acrylates such as allyl polyethylene glycol methacrylates or acrylates.

For the obtention of such (meth)acrylated acrylic oligomers A), radical initiators can be used e.g. peroxides and azo compounds (U.S. Pat. No. 2,471,959). Suitable examples for organic peroxides can be dibenzoyl peroxide, lauryl peroxide, for peresters tert.-butyl-per-2-ethylhexanoate and for azo compounds azo bisisobutyronitrile.

In another embodiment, the oligomer A) component comprises polyester segments, which means that oligomer A) is a (meth) acrylated polyester.

Most commonly, the polyester segments are typically prepared from the polycondensation of one or more polyhydric alcohols typically having from 2 to 15 carbon atoms with one or more polycarboxylic acids typically having from 2 to 14 carbon atoms, although carbon chain lengths can be longer. The resulting polyester polyols are esterified in presence of an ethylenically unsaturated carboxylic acid monomer which is (meth)acrylic acid. The polyester segments may be of same nature as those (polyester polyols) disclosed above for making the polyurethane segments (polyurethane segments based on polyester polyols, in particular diols). Polyester segments for (meth)acrylated polyesters as oligomer A) can also and in particular be based on polycaprolactone.

Component B)

The coatings based on the present invention contain as an important ingredient 0.1 to 35 wt.-%, preferably 0.1 to 30.0 wt.-% and especially preferred 0.5 to 30 wt.-%, based on the total weight of coating, of at least one (meth)acrylate with a low surface tension as defined above and meaning with a measured surface tension by the contact angle method, lower than 35 mN/m, preferably lower than 32 mN/m and more preferably from 25 to 30 mN/m.

Suitable examples of monomers as defined according to B) may be selected from the group consisting of: tert-butyl cyclohexyl acrylate (SR217 from Sartomer), isobornyl acrylate (SR 506) isodecyl acrylate, 3,5,5 trimethyl cyclohexyl acrylate and methacrylate, isooctyl acrylate, octyl decyl acrylate, tridecyl acrylate, lauryl 4EO acrylate and $C_{12}$-$C_{15}$ alkyl methacrylate.

Component C)

The coatings based on the present invention contain as an important ingredient 0.1 to 20 wt.-%, preferred 0.5 to 20 wt.-% and especially preferred based on the total weight of coating, of at least a (meth)acrylate with a high hydrophilicity meaning having a calculated Hansen solubility parameter $\delta_p$ higher than 4 $MPa^{1/2}$ preferably higher than 5 $MPa^{1/2}$.

Suitable monomers C) may be selected from the group consisting of: 2-ethoxyethyl acrylate, 2(2-ethoxyethoxy)-ethyl acrylate which is synonym of acrylate of diethylene glycol monoethyl ether (like SR256 of Sartomer) or tetrahydrofufuryl acrylate (like SR285 of Sartomer).

Component D)

For the polymerization or the cross linking of the coatings based on the present invention known photoinitiators D) are used, added to the coatings' composition in the amount of 0 to 10 wt.-%, preferred 0 to 5 wt.-%, based on the total weight of the coatings' composition.

According to a special aspect of the present invention for hardening and cross linking the curable coating composition of the invention, photoinitiators like F) e.g. UV-initiators are used. These are compounds, which under irradiation by visible or UV-light make scission into radicals and thereby initiate the polymerization of the coatings' material. Normally, used UV-initiators are according to DE-OS 29 28 512 e.g. benzoine, 2-methyl benzoine, benzoin methyl, ethyl or butyl ether, acetoine, benzile, benzile dimethylketal or benzo phenone. Such UV-initiators are commercially available by BASF SE with the trade name Darocur® 1173, Irgacure® 184, Irgacure® 907 and Lucirin® TPO. Examples of photoinitiator, which absorb in the range of visible light are Lucirin® TPO and Lucirin® TPO-L from BASF, Ludwigshafen. Also initiators by the company Lambson, UK, may be used.

According to another special embodiment of the present invention, no initiator is used and the hardening and crosslinking (or cure) of the composition is achieved by EB curing.

Component E)

Ethylenically unsaturated reactive diluents E), preferably (meth)acrylate-functional reactive diluents E) can be used as thinners. In general, the coatings' material contain from 0 to 75 wt.-%, preferably 5 to 60 wt.-%, based on the total weight of the coatings' composition material (vs A+B+C+D+E+F). A mixture of reactive diluents E) can also be used as thinners.

By using such a thinner, the viscosity of the coatings' material can be regulated into the range of 10 to around 250 mPa·s.

For coatings' material which will be applied by flod or diving technique, lower viscosities in the range of 1-20 mPa·s are used. For these coatings organic solvents in the concentration of up to 75 wt.-% can be used. For application by doctor blade or roll the used viscosities are in the range of 20 to 250 mPa·s. The mentioned values are only given for indication and are related to a viscosity measurement at 20° C. in a rotation viscosimeter according to DIN 53 019. By coatings applied by roll the use of mono functional reactive thinners is used.

Typical concentrations are between 0.5 and 25 wt.-%. In combination with reactive diluents E), organic solvents (non-reactive) can also be used as thinners. Functional reactive thinner help to achieve good levelling properties of the coating and thereby to the processability. The functional reactive thinners consist of one or several free radically polymerizable groups, preferably (meth)acrylic group.

For the preparation of the coatings based on the present invention, monofunctional monomers can be added as thinners.

To these may be mentioned amongst others 1-alkenes, like hexene-1, heptene-1, branched alkenes, like for example vinyl cyclohexane, 3,3-dimethyl-1-propene, 3-methyl-1-diisobutylene, 4-methylpentene-1, acrylonitrile, vinyl esters, like vinyl acetate, styrene, substituted styrenes with an alkyl substituent in the side chain, like e.g. alpha-methyl styrene and alpha-ethyl styrene, substituted styrenes with an alkyl substituent in the ring, like vinyl toluene and p-methyl styrene, halogenated styrenes, like for example mono-chloro styrenes, dichloro styrenes, tribromo styrenes and tetrabromo styrene, heterocyclis vinyl compounds, like 2-vinyl pyridine, 3-vinylpyridine, 2-methyl-5-vinyl pyridine, 3-ethyl-4-vinyl pyridine, 2,3-dimethyl-5-vinylpyridine, vinyl pyrimidine, vinyl piperidine, 9-vinyl carbazole, 3-vinyl carbazole, 4-vinylcarbazole, 1-vinyl imidazole, 2-methyl-1-vinyl imidazole, N-vinyl pyrrolidone, 2-vinylpyrrolidone, N-vinyl pyrrolidine, 3-vinyl pyrrolidine, N-vinyl caprolactame, N-vinylbutyrolactame, vinyl oxolane, vinyl furane, vinyl thiophene, vinyl thiolane, vinyl thiazole and hydrated vinyl thiazole, vinyl oxazoles and hydrated vinyl oxazoles, vinyl- and isoprenyl ether and (meth)acrylates, whereby (meth)acrylates are especially preferred. Diluent E) is preferably selected from (meth)acrylates, which comprise methacrylates and acrylates as well as mixtures of both. These monomers are widely known. Amongst these reactive diluents E), one specific preference is (meth)acrylates, which are derived from saturated alcohols, like for example methyl (meth)acrylate, ethyl (meth) acrylate, propyl (meth)acrylate, n-butyl (meth)acrylate, tert.-butyl (meth)acrylate, pentyl (meth)acrylate and 2-ethylhexyl (meth)acrylate, (meth)acrylates, which are derived from unsaturated alcohols, like for example oleyl (meth)acrylate, 2-propionyl (meth)acrylate, allyl (meth)acrylate, vinyl (meth)acrylate, aryl (meth)acrylates, like benzyl (meth)acrylate or phenyl (meth)acrylate, whereby the aryl group can be without a substituent or may have until four substituents, cycloalkyl (meth)acrylates, like 3-vinyl cyclohexyl (meth) acrylate, bornyl (meth)acrylate; hydroxylalkyl (meth)acrylates, like 3-hydroxypropyl (meth)acrylate, 3,4-dihydroxybutyl (meth)acrylate, 2-hydroxyethyl (meth)acrylate, 2-hydroxypropyl (meth)acrylate; glycoldi (meth)acrylates, like 1,4-butandiol di(meth)acrylate, (meth)acrylates of ether alcohols, vinyloxyethoxyethyl (meth)acrylate; amides and nitriles of (meth)acrylic acid, like N-(3-dimethyl aminopropyl)(meth)acrylamide, N-(Diethylphosphono)(meth)acrylamide, 1-Methacryloylamido-2-methyl-2-propanol; sulphur containing methacrylates, like ethyl sulfinyl ethyl (meth)acrylate, 4-thiocyanato butyl (meth)acrylate, ethyl sulfonyl ethyl (meth)acrylate, thiocyanato methyl (meth)acrylate, methyl sulfinyl methyl (meth)acrylate and bis((meth)acryloyl oxyethyl)sulfide. Preferred are mono functional reactive thinners like e.g. butyl acrylate, 2-hydroxy ethylacrylate, 2-hydroxy ethyl methacrylate, hydroxyl propyl acrylate, hydroxyl propyl methacrylate, methyl methacrylate, tert-butyl methacrylate, isobornyl methacrylate.

For the preparation of the coatings based on the present invention, crosslinking monomers can also be added as thinners with a functionality in ethylenic unsaturations, preferably in (meth)acrylic groups, of at least 2. These contain at least two (meth)acrylate polymerizable units per molecule or they may contain at least one (meth)acrylate group and one allylic group, which may be substituted, in particular by an alkyl preferably a methyl group. Examples can be diesters and higher esters of acrylic and methacrylic acid of polyvalent alcohols like glycol, glycerine, trimethyl olethane, trimethylol propane, pentaerythritol, diglycerine, dimethylol propane, ditrimethyl olethane, dipentaerythritol, trimethyl hexandiol-1,6, cyclo hexandiol-1,4. Examples for such cross linking monomers are e.g. ethylene glycoldiacrylate, ethylene glycoldimethacrylate, propylene glycoldiacrylate, propylene glycoldimethacrylate, 1,3-butane dioldiacrylate, 1,3-butandiol dimethacrylate, neopentyl glycoldiacrylate, neo-pentyl glycoldimethacrylate, diethylene glycoldiacrylate, diethylene glycoldimethacrylate, 4-thio-heptanol-2,6-diacrylate, 4-thio-heptanol-2,6-dimethacrylate, tetraethylene glycoldiacrylate, Tetraethylene glycoldimethacrylate, pentandioldiacrylate, pentanediol dimethacrylate, hexandioldiacrylate, hexandioldimethacrylate, trimethylolpropantri(meth)acrylate, ditrimethylolpropane tetraacrylate, ditrimethylolpropantetra methacrylate, dipentaerythritol hexaacrylate and dipentaerythritol hexamethacrylate, pentaerythritol tri acrylate and pentaerythrittol tetraacrylate. As suitable examples of crosslinking monomers for use as reactive diluents E), bearing at least one (meth) acrylate and one allylic group can be cited allyl acrylate or allyl methacrylate and other allyl acrylates or allyl methacrylates bearing a substituted allylic group, in particular substituted by an alkyl group preferably a methyl group, like 2-methyl-allyl acrylate or 2-methyl-allyl methacrylate (respectively also named methyl-allyl acrylate and methyl allyl methacrylate) or allyl polyether (meth)acrylates such as allylpolyethylene glycol methacrylates or acrylates.

Reactive diluents E) may be combined with non-reactive diluents (current organic solvents).

EP 0 035 272 discloses normally used organic solvents for scratch resistant coatings, which could be used as thinners. Usable are e.g. alcohols like ethanol, iso propanol, n propanol, iso butyl alcohol and n-butyl alcohol, methoxy propanol, methoxy ethanol.

Also aromatic solvents like toluene or xylene may be used. Ketones like e.g. acetone or methyl ethyl ketone may be present but in combination with the said reactive diluents E). Also in such a combination, ether compounds like diethyl ether or ester compounds like e.g. ethyl acetate, n-butyl acetate or ethyl propionate can be used. These compounds can be used alone or as combinations of different compounds.

Component F)

The radiation-curable coating's composition material of the present invention may contain as an adhesion promoter monomer from 0 to 20 wt.-%, preferably from 0 to 15 wt.-% and more preferably from 0.05 to 15 wt.-%, based on the total weight of the coatings' material, of a phosphoric ester bearing at least one ethylenically unsaturated group preferably (meth)acrylate group. Preferably, these esters are monophosphates esters of phosphoric acid with a partially acrylated polyol bearing one free OH. Suitable examples of such phosphates F) are selected from: monoesters of hydroxyalkyl (meth)acrylates with phosphoric acid which may additionally comprise a diester of hydroxyl alkyl (meth) acrylate with phosphoric acid. Suitable hydroxyl alkyl (meth)acrylates include hydroxyethyl, hydroxypropyl, hydroxybutyl (meth)acrylates.

Other Current Additives

Normally, the range of used other current additives for coatings with good adhesion properties is from 0 to 10 wt.-% (with respect to A+B+C+D+E+F). The use of these additives is not considered critical for the present invention. Here should be mentioned for example surface active substance, which help to regulate the surface tension of the coatings' formulation and let achieve good application properties. According to EP 0 035 272 e.g. silicones, like different polymethyl siloxane types can be used in the concentrations of 0.0001 to 2 wt.-%. Further widely used additives are UV-absorber, which can be used in concentrations of e.g. 0.2 to 5 wt.-%, preferred from 2 to 5 wt.-%. UV-Absorber can be for example from the group of hydroxyl benzotriazoles, triazines and hydroxyl benzophenones (see e.g. EP 247 480). Such UV-absorbers are additives used against photooxidation.

The coating based on the present invention enables the production of scratch-resistant, weatherable (durable) coatings on plastic substrates. Hereby plastic substrates can be e.g. poly carbonates, poly styrenes, poly ester, for example poly ethylene terephthalate (PET), which can be modified by glycols and poly butylenes terephthalate (PBT), cyclo olefinic copolymers (COC), acrylonitrile/butadiene/styrene copolymers and/or poly(meth)acrylates. Preferred are hereby poly carbonates, cyclo olefinic polymers and poly (meth)acrylates, whereby poly(meth)acrylates are especially preferred. Polycarbonates are known to the expert. Polycarbonates can be formally seen as poly ester of carbonic acid and aliphatic or aromatic dihydroxy compounds. They are easily available by reaction of diglycols or bisphenols with phosgene or carbonic acid diesters in poly condensation and esterifaction reactions. Hereby polycarbonates derived from Bisphenols are preferred. Amongst these bisphenols may be 2,2-bis-(4-hydroxyphenyl) propane (Bisphenol A), 2,2-bis-(4-hydroxyphenyl) butane (Bisphenol B), 1,1-Bis(4-hydroxyphenyl) cyclohexane (Bisphenol C), 2,2'-Methylendiphenol (Bisphenol F), 2,2-Bis(3,5-dibrom-4-hydroxy-phenyl) propane (Tetrabrombisphenol A) and 2,2-Bis(3,5-dimethyl-4-hydroxy-phenyl) propane (Tetramethylbisphenol A). Normally, these aromatic polycarbonates are made by surface poly condensation or transesterification, where details can be found in Encycl. Polym. Sci. Eng. 11, 648-718. Cyclo olefinic polymers are polymers, which are formed by use of cyclic olefins, especially of poly cyclic olefins. Cyclic olefins comprises for example mono cyclic olefins, like cyclo pentene, cyclo pentadiene, cyclo hexene, cyclo heptene, cyclo octane as well as alkyl derivatives of these mono cyclic olefins with 1 to 3 carbon atoms, like methyl, ethyl or propyl, like for example methyl cyclo hexene or dimethyl cyclo hexene, as well as arylate and/or methacrylate derivatives of these mono cyclic compounds. Also cyclo alkanes with olefinic side chains may be used as cyclic olefins, like for example cyclopentyl methacrylate. Preferred are bridged, poly cyclic olefin compounds. These poly cyclic olefin compounds may have the double bond as well in the ring, hereby one speaks of bridged poly cyclic cyclo alkenes, as well as in the side chains. These are vinyl derivates, allyloxycarboxy derivatives and (Meth)acryloxy derivates of poly cyclic cyclo alkane compounds. These compounds may contain further alkyl, aryl or aralkyl substituents. Examples for poly cyclic compounds are, without a limitation are, bicyclo[2.2.1]hept-2-ene (norbornene), bicyclo[2.2.1]hept-2,5-diene (2,5-norbornadiene), ethyl bicyclo[2.2.1]hept-2-ene (ethyl norbornene), ethylidene bicyclo[2.2.1]hept-2-ene (ethylidene-2-norbornene), phenyl bicyclo[2.2.1]hept-2-ene, bicyclo [4.3.0]nona-3,8-diene, tricyclo[4.3.0.12,5]-3-decene, tricyclo[4.3.0.12,5]-3,8-decen-(3,8-dihydrodicyclopentadiene), tricyclo[4.4.0.12,5]-3-undecene, tetracyclo[4.4.0.12,5, 17,10]-3-dodecene, ethylidene tetracyclo [4.4.0.12,5.17,10]-3-dodecene, methyloxy carbonyltetracyclo [4.4.0.12,5,17, 10]-3-dodecene, ethylidene-9-ethyltetracyclo[4.4.0.12,5,17, 10]-3-dodecene, pentacyclo [4.7.0.12,5,O,O3,13,19,12]-3-pentadecene, pentacyclo [6.1.13,6.02,7.09,13]-4-pentadecene, hexacyclo[6.6.1.13,6.110,13.02,7.09,14]-4-heptadecene, dimethylhexacyclo-[6.6.1.13,6.110,13.02,7.09,14]-4-heptadecene, bis(allyloxycarboxy) tricyclo[4.3.0.12,5]-decane, bis(methacryloxy)tricyclo[4.3.0.12,5]-decane, bis (acryloxy)tricyclo[4.3.0.12,5]-decane. The cyclo olefinic polymers may be produced making use of at least one of the prior described cyclo olefinic compounds, especially poly cyclic carbohydrate compounds.

It is possible to achieve the cyclo olefinic polymer by radical polymerization, where light or an initiator is justed for radical formation.

A preferred plastic substrate is based on poly(meth) acrylates and polyolefines. The plastic substrates can be prepared based on the above mentioned polymers. Hereby in general thermoplastic form giving processes may be used, like extrusion of injection moulding.

EXPERIMENTAL

To illustrate the practice of the present invention, the following examples will be described, wherein parts are to be understood as parts by weight. The invention relates to the following examples. The examples are for identification purposes only and in no way limit the invention.

Examples

I. Polymers Used as Plastic Parts
A1) PP/EPDM, mineral filled, Finalloy® 720/1, received by Total Fina.
A2) PC/PET, mineral filled, Makroblend® UT235M, received by Covestro.

The commercially available polymers were transformed in the form of plaques by injection molding with known technique.

II. Paint Testing
II.A) Raw Materials for Coatings
II.A1) Wörwag primer slate gray conductive, received by KARL WÖRWAG Lack-und Farbenfabrik GmbH & Co KG.
II.A2) Base coat black uni MB 9040, received by BASF Coatings.
II.A3) Wörwag clear coat 11141, received by KARL WÖRWAG Lack-und Farbenfabrik GmbH & Co KG.
II.B) Additives
II.B1) WW hardener, received by KARL WÖRWAG Lack-und Farbenfabrik GmbH & Co KG.
II.C) UV-Und EB-Curable Raw Materials According to the Invention
II.C1) Primer-Formel, from Sartomer (see tables 1 and 2).
II.C2) BC (Base coat)-Formel, from Sartomer (see table 3).
II.C3) CC (Clear coat)-Formel, from Sartomer (see table 4).
Activation of the Plaques Gas flame: Flaming of the plaques was realized by using city gas in the mix with air in the relation 1 to 8 and a distance of the burner head of 100 mm from the substrate surface.
Preparation
Primer and Isocyanate 100 parts Wörwag primer slate gray conductive and 10 parts depending of the examples II. B1 were mixed shortly prior to use at 600 r.p.m. and with a disc known to a technician, for 3 min.
Base Coat and Isocyanate 100 parts base coats black uni MB 9040 and 5 parts depending of the examples II.B1 were mixed shortly prior to use at 600 r.p.m. and with a disc known to a technician for 3 min.
Clear Coat and Isocyanate 100 parts clear coat 11141 and 35 parts depending of the examples II.B1 were mixed shortly prior to use at 600 r.p.m. and with a disc known to a technician for 3 min. After activation and depending of the example, the plaques were coated with primer, base coat and clear coat under the following conditions:

Primer: Wörwag primer slate gray conductive, applied with a pistol in two hands to achieve a dry layer thickness of 12 μm. The primer was dried for 25 min at 85° C. and then, depending on the example, the base coat was applied.

Primer according to the present invention P1 or P2, applied with a pistol in two hands to achieve a dry layer thickness of 12 μm. Using lamp of company Heraus with power of 120 W at a conveyor speed of 10 m/min the curing was realized and depending on the example, the base coat was applied.

TABLE 1

Primer P1 formula according to the invention

| Formula | Component type vs invention | Supplier |
|---|---|---|
| CN704 (35%) | A) Polyester diacrylate (Mw~5000 g:mol) | Sartomer |
| SR9003 (16.5%) | E) Reactive difunctional diluent | " |
| SR256 (13.2%) | C) Hydrophilic monomer | " |
| SR217 (24.3%) | B) Low surface tension monomer | " |
| SR454 (5%) | E) Reactive thinner (diluent) | " |
| Benzo (2%) (Benzophenone) | | |
| Darocure ® 1173 (4%) | D) Photoinitiator | |

TABLE 2

Primer P2 formula according to the invention

| Formula | Component type vs invention | Supplier |
|---|---|---|
| PRO21407 (35%) | A) Urethane diacrylate oligomer, with 4.9% free NCO (based on polyester) | Sartomer |
| SR9003 (15%) | E) Reactive difunctional diluent | " |
| SR256 (12%) | C) Hydrophilic monomer | " |
| SR217(22%) | B) Low surface tension monomer | " |
| SR9051 (10%) | F) Acid based adhesion promoter | " |
| Benzo (2%) | | |
| Darocure ® 1173 (4%) | D) Photoinitiator | Ciba |

Base coat: black uni MB 9040, applied with a pistol in two hands to achieve a dry layer thickness of 15 μm. The base coat was dried for 25 min at 85° C. and then, depending on the example the clear coat was applied.

Base coat according to the present invention BC, applied with a pistol in two hands to achieve a dry layer thickness of 12 μm. Using lamp of company Heraus with power of 120 W at a conveyor speed of 10 m/min the curing was realized and then, depending on the example, the clear coat was applied.

TABLE 3

Base coat (BC) formula according to the invention

| Formula | Component type vs invention | Supplier |
|---|---|---|
| CN820 (35%) | A) Oligomer, diacrylate Mw~11000 | Sartomer |
| PRO21407(10%) | A) Oligomer urethane diacrylate with 4.9% free NCO | " |
| SR9003 (15%) | C) Reactive difunctional diluent | " |
| SR256 (12%) | C) Hydrophilic monomer | " |
| SR217(22%) | B) Low surface tension monomer | " |
| Benzo (2%) | | |
| Darocure ® 1173 (4%) | D) Photoinitiator | Ciba |

Clear coat: Wörwag High gloss clear coat 11141, applied with a pistol in two hands to achieve a dry layer thickness of 35 μm. The clear coat was dried for 30 min at 85° C.

Clear coat according to the present invention: CC-Formel of Sartomer, applied with a pistol in two hands to achieve a dry layer thickness of 35 μm. Using lamp of company Heraus with power of 120 W at a conveyor speed of 10 m/min the curing was realized.

TABLE 4

Clear Coat formula according to the invention

| Formula | Component type vs invention | Supplier |
|---|---|---|
| CN9210 (25%) | A) Urethane hexaacrylate oligomer, Mw~1500 | Sartomer |
| CN9001 (10%) | A) Urethane diacrylate oligomer, Mw 3250 (based on polyester) | " |
| SR238 (35%) | E) Reactive difunctional diluent | " |
| SR833S (20%) | E) Reactive difunctional diluent | " |
| SR285 (4%) | C) Hydrophilic monomer | " |
| SR506 (3%) | B) Low surface tension monomer | " |
| Irgacure ® 184 (3%) | D) Photoinitiator | BASF |

Depending on the example also, the activation step was not realized. The nonactivated plaques were coated with primer, base coat and clear coat under the following conditions:

Primer: Wörwag Haftprimer slate gray conductive, applied with a pistol in two hands to achieve a dry layer thickness of 12 μm. The primer was dried for 25 min at 85° C. and then, depending on the example, the base coat was applied.

Primer according to the present invention: Primerformel of Sartomer, applied with a pistol in two hands to achieve a dry layer thickness of 12 μm. Using lamp of company Heraus with power of 120 W at a conveyor speed of 10 m/min the curing was realized and then, depending of the example, the base coat was applied.

Base coat: black uni MB 9040, applied with a pistol in two hands to achieve a dry layer thickness of 15 μm. The base coat was dried for 25 min at 85° C. and then, depending of the example the clear coat was applied.

Base coat according to the present invention: BC-Formel of Sartomer, applied with a pistol in two hands to achieve a dry layer thickness of 12 μm. Using lamp of company Heraus with power of 120 W at a conveyor speed of 10 m/min the curing was realized and then, depending of the example, the clear coat was applied.

Clear coat: Wörwag High gloss clear coat 11141, applied with a pistol in two hands to achieve a dry layer thickness of 35 μm. The clear coat was dried for 30 min at 85° C.

Clear coat according to the present invention: CC-Formel of Sartomer, applied with a pistol in two hands to achieve a dry layer thickness of 35 μm. Using lamp of company Heraus with power of 120 W at a conveyor speed of 10 m/min the curing was realized. After conditioning, the paint tests were realized.

The painted plaques were submitted to the following tests:
Steam Jet Test (SJ)

This test is used for examination of paint adhesion on painted plastic parts for exterior use as well as for test of delamination.

Procedure:

A sample preparation: even, size>5×13 cm.

B Impact: St. Andrews cross (according to DIN 55662 1. scratch>12 cm, 2. Scratch>5 cm).

C Positioning: fixed, jet centre in the middle of the St. Andrews cross, jet covers the long scratch.

D Testing: Sample is submitted the defined test parameters according to DIN55 662.

E Evaluation: visual evaluation using comparison photographs of DIN 55 662.

F Results: Evaluation in comparison with photographs of DIN 55 662, whereby cw 0 and 1=green, cw 2=yellow, cw 3 to 5=red.

Test parameter: according to DIN 55662 Verfahren B. Steam Jet Test after Temperature Shock (SJ after TS)

The time for TS is 3 cycles. Each cycles was 15 h at 105° C., 30 min. At 23±2° C., 8 h at −40° C. and 30 min. at 23±2° C., than the above described steam jet, test was realized.

The results of SJ and SJ after TS tests are summarized in Table 5. 20 specimens were used for each test.

TABLE 5

Results for paint adhesion

| Exp. | 1 comp | 2 comp | 3 | 4 | 5 comp | 6 comp | 7 | 8 | 9 | 10 | 11 | 12 |
|---|---|---|---|---|---|---|---|---|---|---|---|---|
| Substrate | Fin. 720 | Makro. UT235M | Fin. 720 | Makro. UT235M | Fin. 720 | Makro. UT235M | Fin. 720 | Makro. UT235M | Fin. 720 | Makro. UT235M | Fin. 720 | Makro. UT235M |
| Activation Y/N | Y | N | Y | N | Y | N | Y | N | Y | N | Y | N |
| Primer | R1471 | R1471 | P2 | P1 | R1471 | R1471 | R1471 | R1471 | R1471 | R1471 | P2 | P1 |
| Base Coat (BC) | nothing | nothing | nothing | nothing | black uni | black uni | black uni | black uni | BC | BC | BC | BC |
| Clear Coat (CC) | nothing | nothing | nothing | nothing | R3209E | R3209E | CC | CC | R3209E | R3209E | CC | CC |
| Steam Jet(SJ)cw 0, 1 | 10 | 10 | 10 | 8 | 9 | 9 | 9 | 9 | 9 | 9 | 10 | 10 |
| SJ > cw1 | 0 | 0 | 0 | 2 | 1 | 1 | 1 | 1 | 1 | 1 | 0 | 0 |
| TS cw 0, 1 | 15 | 16 | 18 | 19 | 17 | 19 | 18 | 20 | 18 | 20 | 20 | 20 |
| TS > cw1 | 5 | 4 | 2 | 1 | 3 | 1 | 2 | 0 | 2 | 0 | 0 | 0 |

It is shown from these results that:

The use of the primer based on the invention improves the substrate adhesion compared to conventional compositions.

The use of the primer based on the invention improves the interlayer adhesion compared to conventional compositions.

The use of the primer based on the invention improves the substrate adhesion and the interlayer adhesion compared to conventional compositions.

The use of the base coat based on the invention improves the substrate adhesion compared to conventional compositions.

The use of the base coat based on the invention improves the interlayer adhesion compared to conventional compositions.

The use of the base coat based on the invention improves the substrate adhesion and the interlayer adhesion compared to conventional compositions.

The use of the clear coat based on the invention improves the substrate adhesion compared to conventional compositions.

The use of the clear coat based on the invention improves the interlayer adhesion compared to conventional compositions.

The use of the clear coat based on the invention improves the substrate adhesion and the interlayer adhesion compared to conventional compositions.

The invention claimed is:

1. Radiation-curable coating composition comprising:
A) from 20 to 60 wt. % of at least one oligomer bearing at least one ethylenic unsaturation, wherein said at least one oligomer comprises a urethane (meth)acrylate bearing free isocyanate groups,
B) from 0.1 to 35 wt. % of at least one ethylenically unsaturated monomer having a surface tension measured according to contact angle method NF EN14370 which is lower than 35 mN/m,
C) from 0.1 to 20 wt. % of at least one ethylenically unsaturated monomer with high hydrophilicity having a Hansen solubility parameter δp, calculated according to the method described in "Hansen Solubility Parameters: a user's handbook" by Charles M. Hansen ISBN 068494-1525-5 (chapter I, table 1.1) higher than 4 $MPa^{1/2}$,
D) 0 to 10 wt. % of at least one photoinitiator,
E) 0 to 75 wt. % of a reactive diluent selected from at least one ethylenically unsaturated monomer other than B) and C) and bearing at least one ethylenically unsaturated group,
F) 0 to 20 wt. % of a phosphoric ester comprising a (meth)acrylate group used as an adhesion promoter and wherein the sum of wt % of components A+B+C+D+E+F is 100%.

2. Radiation-curable coating composition according to claim 1, wherein the composition comprises:
A) 20 to 50 wt.-% of said at least one oligomer A), with said oligomer comprising at least one oligomeric segment selected from polyurethane and/or poly(meth)acrylate and/or polyester segments and
B) 0.1 to 30 wt. % of said at least one ethylenically unsaturated monomer B), with said monomer B) being selected from the group consisting of tert-butyl cyclohexyl acrylate, isobornyl acrylate isodecyl acrylate, 3,5,5 trimethyl cyclohexyl acrylate and methacrylate, isooctyl acrylate, octyl decyl acrylate, tridecyl acrylate, lauryl 4EO acrylate (with lauryl bearing 4 ethoxy units) and $C_{12}$-$C_{15}$ alkyl methacrylate,
C) 0.5 to 20 wt.-% of said at least one ethylenically unsaturated monomer C), wherein said monomer C) is selected from the group consisting of 2-ethoxyethyl acrylate, 2 (2-ethoxyethoxy)-ethyl acrylate and tetrahydrofufuryl acrylate,
D) 0 to 5 wt.-% of said least one photoinitiator,
E) 5 to 60 wt.-% of said reactive diluent
F) 0 to 15 wt.-% of said phosphoric ester, wherein said phosphoric ester F) comprises monoesters of hydroxyalkyl (meth)acrylates with phosphoric acid.

3. Radiation curable coating composition according to claim 1, wherein said oligomer A), has a number average molecular weight Mn of from 1000 to 12000 as measured by GPC in THF with polystyrene standard calibration.

4. Radiation-curable coating composition according to claim 1, wherein the composition comprises components A), B), C) and E).

5. Radiation-curable coating composition according to claim 1, wherein the composition comprises components A), B), C) and D).

6. Radiation-curable coating composition according to claim 5, wherein component E).

7. Radiation-curable coating composition according to claim 1, wherein the composition is a UV and/or an EB-curable composition.

8. Radiation-curable coating composition according to claim 1, wherein said oligomer A) further comprises polyester acrylate or an acrylic (meth)acrylate oligomer bearing at least two (meth)acrylic groups or a mixture of at least two of them.

9. Radiation-curable coating composition according to claim 1, wherein said oligomer A) is a urethane (meth)acrylate bearing free isocyanate groups.

10. Radiation-curable coating composition according to claim 9, wherein said oligomer A) has a content of free isocyanate groups from 0.5 to 20% by weight of —NCO groups.

11. Radiation-curable coating composition according to claim 1, wherein said oligomer A) is a urethane (meth)acrylate bearing from 2 to 6 (meth)acrylic groups.

12. Radiation curable coating composition according to claim 11, wherein said urethane (meth)acrylate oligomer comprises polyester segments based on polycaprolactone segments.

13. Radiation curable coating composition according to claim 1, wherein said oligomer A) further comprises an acrylic (meth)acrylated oligomer.

14. Radiation-curable coating composition according to claim 1, wherein the composition is a pigmented coating composition.

15. Cured coating resulting from curing by radiation at least one layer of at least one curable coating composition as defined according to claim 1.

16. Cured coating according to claim 15, wherein the cured coating is a primer, a base coat or a clear coat.

17. A method of using a coating composition as defined according to claim 1, comprising applying the coating composition to a substrate and curing the coating composition.

18. The method according to claim 17, wherein the substrate comprises shaped parts containing plastics.

19. The method according to claim 17, wherein the composition is used in at least one layer or in one or in multiple layers on said substrate and is cured by UV and/or EB radiation for each of said layers.

20. The method according to claim 17, wherein said coating composition is used as a primer and/or as a base coat and/or as a clear coat or as a binary or as a ternary combination of these uses on said substrate.

21. The method according to claim 17, wherein said substrate is a plastic selected from:
    thermoplastics,
    thermosets, or
    mixtures thereof,
    fiber-reinforced polymers or composites derived from the thermoplastics or the thermosets or the mixtures thereof.

22. Shaped part comprising a plastic surface coated with at least one layer of a coating resulting from curing by radiation at least one coating composition as defined according to claim 1.

23. Shaped part according to claim 22, wherein said coating is a primer and/or a base coat and/or a clear coat.

24. Radiation-curable coating composition according to claim 1, wherein the composition comprises:
    A) from 20 to 50 wt.-% of said at least one oligomer A), wherein said at least one oligomer A) further comprises at least two ethylenic unsaturations,
    B) from 0.1 to 30 wt.-% of said at least one ethylenically unsaturated monomer B), wherein said monomer B) is a (meth)acrylate monomer and the surface tension is lower than 32 mN/m,
    C) from 0.5 to 20 wt.-% of said at least one ethylenically unsaturated monomer C), wherein said monomer C) is a (meth)acrylate monomer,
    D) from 0 to 5 wt.-% of said least one photoinitiator,
    E) 5 to 60 wt.-% of said reactive diluent, wherein the least one ethylenically unsaturated group is a (meth)acrylic group, and
    F) 0 to 15 wt.-% of said phosphoric ester.

25. Radiation-curable coating composition according to claim 24, wherein the at least two ethylenic unsaturations of said at least one oligomer A) further comprises (meth)acrylic groups.

26. Radiation-curable coating composition according to claim 11, wherein said (meth)acrylic groups of said oligomer A) further comprises acrylate groups.

* * * * *